(12) United States Patent
Segal

(10) Patent No.: US 9,389,785 B2
(45) Date of Patent: Jul. 12, 2016

(54) EFFICIENT TOUCH EMULATION WITH NAVIGATION KEYS

(71) Applicant: Comigo Ltd., Hod-HaSharon (IL)

(72) Inventor: Ronen Segal, Herzlia (IL)

(73) Assignee: Comigo Ltd., Moshav Yarkona (IL)

( * ) Notice: Subject to any disclaimer, the term of this patent is extended or adjusted under 35 U.S.C. 154(b) by 0 days.

(21) Appl. No.: 14/215,180

(22) Filed: Mar. 17, 2014

(65) Prior Publication Data

US 2015/0261433 A1 Sep. 17, 2015

(51) Int. Cl.
*G06F 3/033* (2013.01)
*G06F 3/0489* (2013.01)
*G06F 3/038* (2013.01)

(52) U.S. Cl.
CPC ............ *G06F 3/04892* (2013.01); *G06F 3/038* (2013.01); *G06F 3/0489* (2013.01)

(58) Field of Classification Search
None
See application file for complete search history.

(56) References Cited

U.S. PATENT DOCUMENTS

| 5,956,029 | A | 9/1999 | Okada et al. | |
|---|---|---|---|---|
| 2003/0157970 | A1* | 8/2003 | Kraft | H04M 1/72583 455/566 |
| 2005/0010901 | A1 | 1/2005 | Udler | |
| 2009/0066653 | A1 | 3/2009 | Wang | |
| 2009/0089676 | A1* | 4/2009 | Finkelstein | G06F 17/30058 715/719 |
| 2010/0207901 | A1* | 8/2010 | Shin | 345/173 |
| 2011/0193787 | A1* | 8/2011 | Morishige | G06F 3/016 345/173 |
| 2011/0199543 | A1* | 8/2011 | Maeda et al. | 348/731 |
| 2013/0055102 | A1 | 2/2013 | Matthews et al. | |
| 2013/0063356 | A1* | 3/2013 | Martisauskas | G06F 3/016 345/168 |
| 2013/0293486 | A1 | 11/2013 | Nave et al. | |
| 2014/0078063 | A1* | 3/2014 | Bathiche | G06F 3/0234 345/168 |

FOREIGN PATENT DOCUMENTS

| CN | 102214057 | 10/2011 |
|---|---|---|
| CN | 103472931 | 12/2013 |
| WO | WO 2013/134975 | 9/2013 |

OTHER PUBLICATIONS

International Search Report and the Written Opinion Dated Jul. 8, 2015 From the International Searching Authority Re. Application No. PCT/IL2015/050272.

* cited by examiner

*Primary Examiner* — Joseph Haley
*Assistant Examiner* — Ifedayo Iluyomade

(57) ABSTRACT

A method for converting touch functionalities to key operated functionalities, comprising: identifying a layout hierarchy structure of a plurality of user interface (UI) elements in an application; defining a plurality of areas of t UI, each corresponding with one of the plurality of UI elements having a touch responsiveness property; and activating a touch event of a UI element corresponding with a currently selected area when an activation key is pressed by said user.

18 Claims, 3 Drawing Sheets

EFFICIENT TOUCH EMULATION WITH NAVIGATION KEYS

FIELD AND BACKGROUND OF THE INVENTION

The present invention, in some embodiments thereof, relates to touch emulation and, more particularly, but not exclusively, to touch emulation using navigation keys.

Many modern consumer electronics products have a touch based interface, making touch the main input method. Most application developers develop their applications with only a touch interface. When an application is built with touch interface, it means that the application responds to finger presses on some 2-dimensional coordinates (x,y) on a screen.

An operating system may be used for different products, some having a touch based interface, while others having no touch interface and may only be controlled by navigation keys.

A simple approach of emulating touch interface with navigation keys is using a mouse cursor that moves in position according to the navigation keys control, i.e. pressing the up, down, left or right key will move the mouse cursor one or more pixel up, down, left or right respectively. Multiple or long presses of the same navigation key may move the cursor faster, over more pixels, in the same direction. In some optimizations of this approach, a long press causes the cursor to accelerate rather than move in a fixed speed.

When used on large screens, composed of thousands of pixels in each coordinate, this approach is inefficient as it still takes a significant amount of time to reach the position that the user would like to press. Specifically, this pixel by pixel movement is not optimal for a user interface (UI) that is composed of widgets, each taking a large area of hundreds or thousands of pixels on the screen.

The UI of most modern applications is composed of a hierarchical layout of UI widgets. In order for a UI widget to be controlled by touch, some widgets are defined with a touch responsiveness property. The touch responsiveness property indicates that the widget has an implementation that runs whenever the user touches that widget. The touch event by the user may also change the appearance of that widget or some other widgets on screen. For example, whenever the user presses a button widget by touching the button on the screen, the widget's UI changes to a "pressed" state and when the user releases his finger from the button, the widget's UI changes back to a "released" state. There are some widgets that are not defined with a touch responsiveness property and are not controllable by a touch, for example, a static text view widget that is displayed on screen.

Some applications designed to be operated by touch are also designed to be operable by navigation keys. This is done by defining a "focusable" property indicating that a widget may be selected by navigation keys.

SUMMARY OF THE INVENTION

According to an aspect of some embodiments of the present invention there is provided a method for converting touch functionalities to key operated functionalities, comprising: identifying a layout hierarchy structure of a plurality of user interface (UI) elements in an application; defining a plurality of areas of the UI, each corresponding with one of the plurality of UI elements having a touch responsiveness property; and activating a touch event of a UI element corresponding with a currently selected area when an activation key is pressed by the user.

Optionally, the method further comprises: presenting a first indicator on a first of the plurality of areas; and replacing the first indicator with a second indicator on a second of the plurality of areas according to a direction of a navigation key pressed by a user and the layout hierarchy structure.

More optionally, the presenting is performed in response to a navigation key pressing event by the user.

More optionally, a first UI element corresponding with the first area and a second UI element corresponding with the second area are at the same level in the layout hierarchy structure.

More optionally, a first UI element corresponding with the first area is at a higher level than a second UI element corresponding with the second area in the layout hierarchy structure and the pressed navigation key is the activation key.

More optionally, a first UI element corresponding with the first area is at a lower level than a second UI element corresponding with the second area in the layout hierarchy structure and the pressed navigation key is a backwards navigation key.

Optionally, the activating is done by emulating touch at a location inside the currently selected area.

Optionally, the method further comprises: activating a continuous touch event of a UI element corresponding with the second area when the activation key is pressed for a prolonged time by the user.

Optionally, the method further comprises: activating a swipe touch event of a UI element corresponding with the second area when both the activation key and the navigation key are pressed simultaneously by the user.

According to some embodiments of the present invention there is provided a computer readable medium comprising computer executable instructions adapted to perform the method.

According to an aspect of some embodiments of the present invention there is provided a system for converting touch functionalities to key operated functionalities, comprising: a structure module for identifying a layout hierarchy structure of a plurality of user interface (UI) elements in an application; a layout module for defining a plurality of areas of the UI, each corresponding with one of the plurality of UI elements having a touch responsiveness property; and an emulation module for activating a touch event of a UI element corresponding with a currently selected area when an activation key is pressed by the user.

Optionally, the system further comprises: a navigation module for replacing a selected first area of the plurality of areas with a second of the plurality of areas according to a direction of a navigation key pressed by a user and the layout hierarchy structure.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
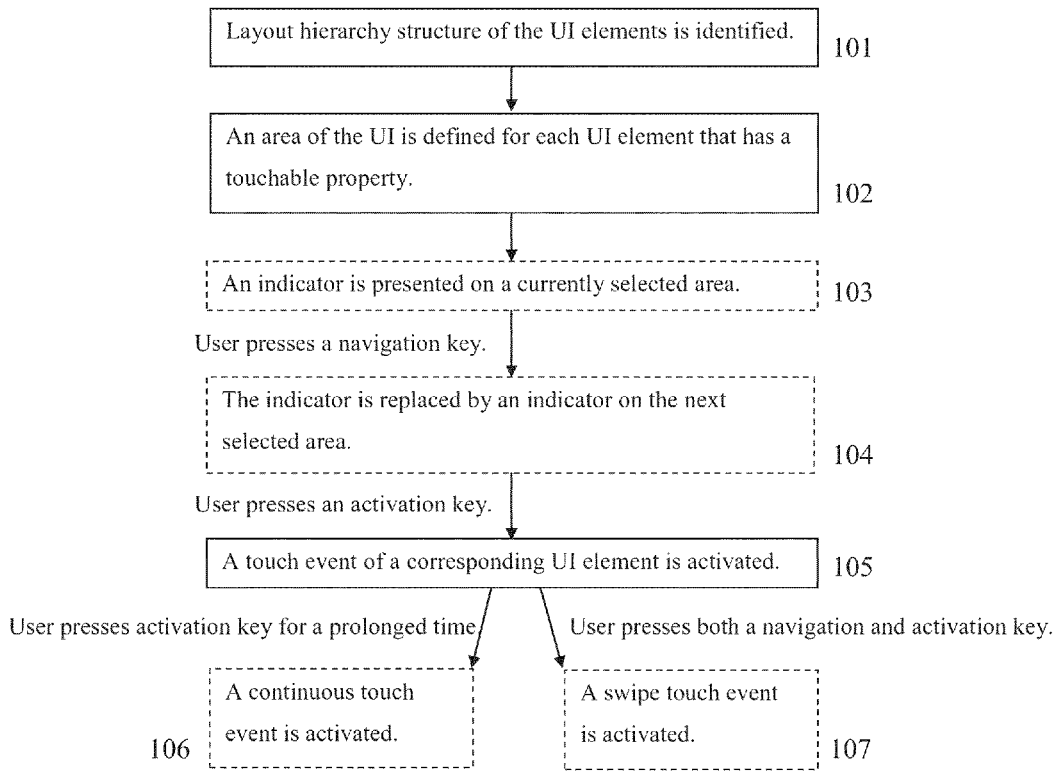
FIG. 1 is a flowchart schematically representing a method for converting touch functionalities to key operated functionalities, according to some embodiments of the present invention.

The present invention, in some embodiments thereof, relates to touch emulation and, more particularly, but not exclusively, to touch emulation using navigation keys.

According to some embodiments of the present invention, there are provided methods and systems for converting touch functionalities to key operated functionalities in an application designed to be operated by touch. These methods and systems allow the use of navigation keys to control applications that are originally designed to be operated by touch events and optionally do not include a user interface (UI) that can be controlled by a keypad, without recoding the code of the application. This allows presenting any application on a non-touchable screen regardless of whether it is designed to be operated by a keypad or not. Optionally, the method is implemented as a module that is embedded inside a viewing and input rendering system, for example, a mobile operation system. Optionally, an existing viewing and input rendering system is modified to include the implementation of the method.

The method may be applied in real-time as part of the operation of a viewing and input rendering system that is rendering the application. When the method is applied, a layout hierarchy structure of UI elements of a target application is identified and an area of the UI is defined for each UI element that has a reactive touch responsiveness property. An indicator may be presented on a currently selected area of the UI in response to a navigation key pressing event. When a user presses the navigation key, the indicator may be replaced by an indicator on the next selected area. When the user presses an activation key, a touch event of a corresponding UI element is activated. This may be done repeatedly throughout the operation of the application by the user.

The method analyzes the structure of the application's user interface (UI). In most devices operating the application, the UI is presented on a touchable screen, such as a screen of a smartphone, a tablet computer and/or touchable screen of a laptop computer. Using this method, the UI may also be controlled when presented on a non-touchable screen, such as a computer screen, a television screen and/or by a projector.

The navigation keys may include, for example, up, down, left and right keys, and an activation key such as "Enter" or "OK". The navigation keys may be included in a physical device, such as a remote control, directional pad (D-pad), trackball and/or arrow keys, and/or virtual, such as a virtual keyboard, and/or gestures navigation mode available in Android operating system. The navigation keys may be connected to and/or included in the device operating the application, or may be a part of remote device, such as a remote control or a mobile device with virtual keys. The remote device may communicate with the device operating the application using any wireless method, such as infra-red (IR), wireless local area network (WLAN) protocol such as Wireless Fidelity (WiFi™), a wireless personal area network (WPAN) such as Bluetooth™ protocol and/or a cellular network.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
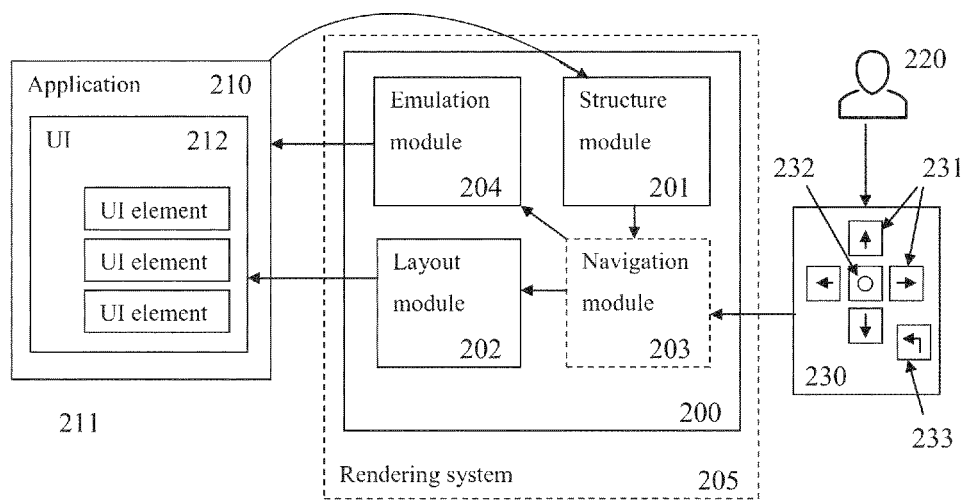
FIG. 2 is a schematic illustration of a system for converting touch functionalities to key operated functionalities, according to some embodiments of the present invention.

Referring now to the drawings, FIG. 1 is a flowchart schematically representing a method for converting touch functionalities to key operated functionalities. Reference is also made to FIG. 2 which is a schematic illustration of a system 200 for converting touch functionalities to key operated functionalities, according to some embodiments of the present invention.

Optionally, system 200 is a module that is embedded inside a viewing and input rendering system 205 such as a mobile operation system. Rendering system 205 may be an existing software product modified to include system 200.

First, as shown at 101, a layout hierarchy structure of the UI elements 211 in application 210 is identified by a structure module 201. Structure module 201 may be, for example, an existing module of rendering system 205 and/or a modified version of such module. Optionally, structure module 201 an existing tool designed for development and/or optimization of application UI, such as Android Hierarchy Viewer, or a modified version of such a tool that is embedded as part of system 200. UI elements 211 may be, for example, buttons, menus, switches, checkboxes, textboxes, widgets, compositions of such elements and/or any other type of layout element. A layout hierarchy structure represents the basic UI elements, grouped into larger UI elements, as those are implemented in the code of the application. The identification of the layout hierarchy structure does not require access to the application's code. The identified layout hierarchy structure may include other UI element details, such as touch responsiveness property, shape, size, functionality and/or any other property.

Figure 3B:
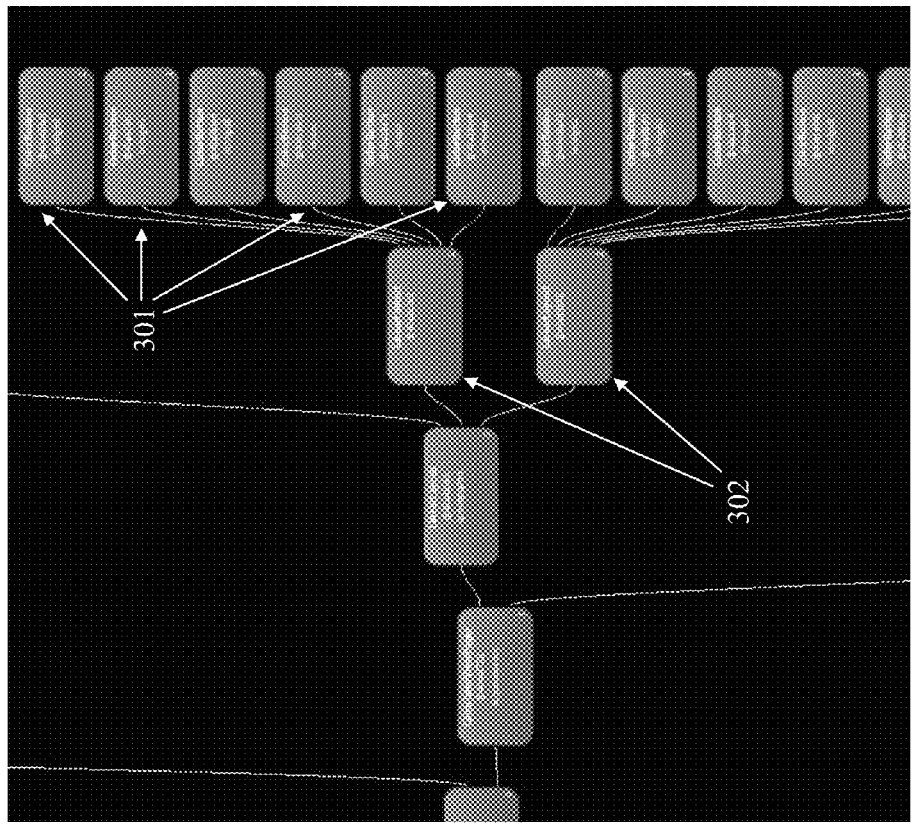
FIG. 3B is a magnified view of some of the user interface (UI) elements 301 in the exemplary layout hierarchy structure of FIG. 3A, according to some embodiments of the present invention.
Figure 3A:
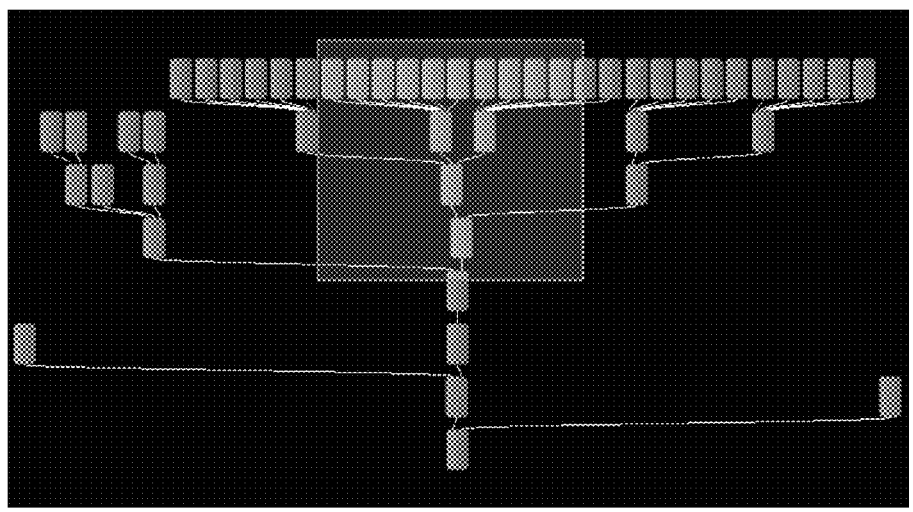
FIG. 3A is an exemplary layout hierarchy structure of a calculator application, according to some embodiments of the present invention.

Reference is now made to FIG. 3A, which is an exemplary layout hierarchy structure of a calculator application, according to some embodiments of the present invention. Reference is also made to FIG. 3B, which is a magnified view of some of the UI elements in the exemplary layout hierarchy structure of FIG. 3A. In this example, basic UI elements 301 representing the buttons of the calculator are grouped into larger UI elements 302 that represent a line of buttons in the calculator.

Then, as shown at 102, an area of UI 212 is defined by a layout module 202 for each one of UI elements 211 that has a touch responsiveness property. The touch responsiveness property may be identified by UI element's details indicated in the layout hierarchy structure.

The areas of UI 212 may be defined in any shape, such as rectangles, circles and/or any other shape. The areas may be defined according to the shape and/or size of the corresponding UI element 211 as it was defined in application 210 to be presented in UI 212.

Layout module 202 may operate, for example, by analyzing each one of UI element 211 in the layout hierarchy structure, checking if the UI element has a touch responsiveness property, determining the UI element's shape and size and defining a corresponding area. The UI elements may be scanned, one by one, so all of them are analyzed. The UI element's shape and size are defined by the application's instructions for UI presentation on a screen and may be identified by UI element's details indicated in the layout hierarchy structure after the layout hierarchy structure is identified and scanned. When a UI element without a touch responsiveness property is analyzed, it is skipped and no area is defined. Optionally, all UI elements are analyzed and corresponding areas are defined, including UI elements that have no touch responsiveness property.

For example, in the exemplary layout hierarchy structure of a calculator application of FIG. 3A and FIG. 3B, basic UI elements 301 and larger UI elements 302 are scanned, for example, from the most upper UI element in the layout hierarchy structure to the UI element at the bottom of the layout hierarchy structure. Each one of UI elements 301 and/or 302 may have a touch responsiveness property.

Then, optionally, as shown at 103, an indicator is presented on a currently selected area of UI 212. The indicator is presented on top of the existing UI of application 210. The indicator may by any kind of visual marker, for example, a cursor, a coloring of the currently selected area and/or an outline around the defined area, such as a rectangle. Optionally, indicator is presented in response to an event of user 220 pressing a navigation key 231 of navigation keys 230.

Then, optionally, as shown at 104, when a user 220 presses navigation key 231 of navigation keys 230, the indicator is replaced by an indicator on the next selected area. The selection of the next area is done by a navigation module 203 according to the layout hierarchy structure. For example, when user 220 presses a "down" navigation key, the indicator is replaced by an indicator on an area that is below the currently selected area on UI 212.

Optionally, when there is no other defined area at the exact direction of the pressed navigation key and/or there are multiple defined areas at that direction, the selection of the next area is done by a selection algorithm that is included in navigation module 203. For example, when there is no defined area directly below the currently selected area on UI 212, and there are defined areas at the right and left lower sides of UI 212, the selection algorithm selects one of the lower areas as the next area. The selection algorithm may select, for example, the area that is closer to the currently selected area.

Figure 4A:
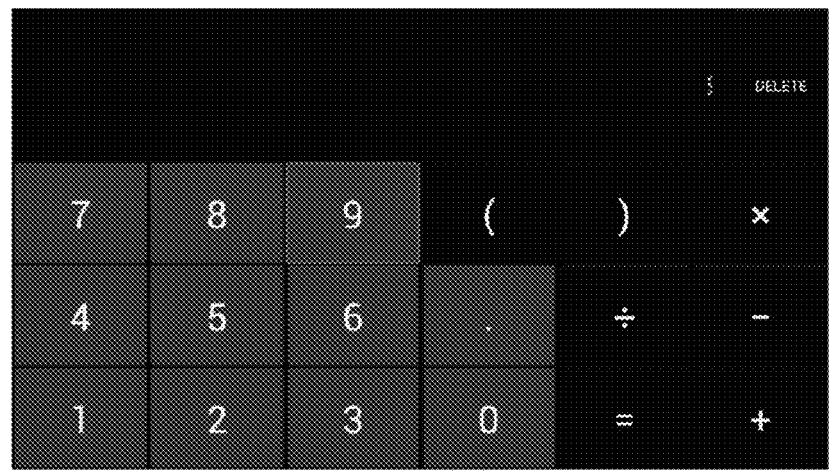
FIG. 4A is an exemplary UI of the calculator application of FIG. 3A with a selected area of UI element "digit 9", according to some embodiments of the present invention.
Figure 4B:
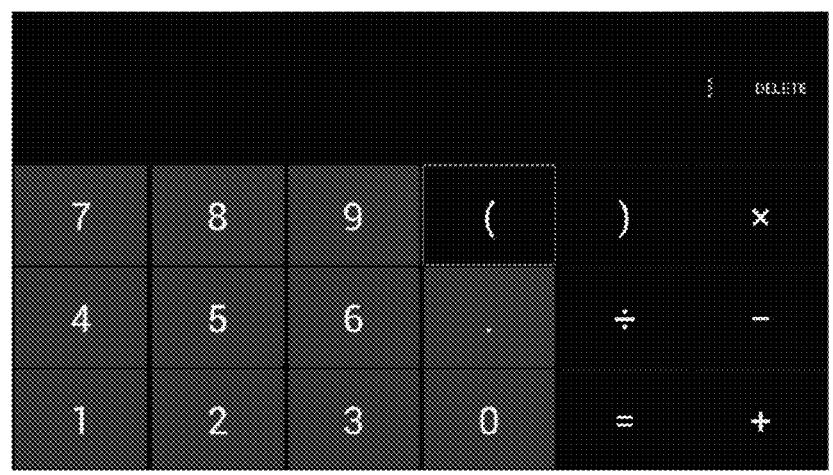
FIG. 4B is the UI of FIG. 3A with a selected area of UI element "left bracket", according to some embodiments of the present invention.

Reference is now made to FIG. 4A, which is an exemplary UI of the calculator application of FIG. 3A with a selected area of UI element "digit 9", according to some embodiments of the present invention. An indicator, shaped as a rectangle, is presented on top of element "digit 9" of the original UI. Reference is also made to FIG. 4B, which is the UI of FIG. 3A with a selected area of UI element "left bracket" with an indicator that replaced the indicator presented on top of element "digit 9", after the user pressed a "right" navigation key.

Optionally, when UI elements that have no touch responsiveness property are also analyzed, a hierarchical navigation is performed. In a hierarchical navigation, the user navigates between UI elements of the same level in the layout hierarchy structure, for example, using the "up", "down", "left" and "right" navigation keys003B and also navigates between levels of the layout hierarchy structure, for example, using an "Enter" key and a "back" key. Optionally, the user navigates between UI elements of the same level that also belong to the same group of one higher-level UI element. For example, in the exemplary calculator application of FIG. 3A, FIG. 3B, FIG. 4A and FIG. 4B, user 220 may navigate between larger UI elements 302 using "up" and "down" navigation keys 231. This will result a presented rectangle indicator around an area of a selected line of buttons in the calculator to be replaced by an indicator around an area of another line of buttons. Then, the user may navigate between levels of the layout hierarchy structure into one of the lines of buttons by pressing an "Enter" key and/or an activation key 232. The user may then navigate between basic UI elements 301, i.e. the buttons in the line, using "left" and "right" navigation keys 231. The user may also navigate back to a higher level by pressing, for example, a "back" key 233 and/or any other key or a combination of keys that is predefined for this action.

Finally, as shown at 105, when user 220 presses activation key 232, a touch event of a UI element 211 corresponding with the selected area is activated by emulation module 204. The activation of the touch event triggers the action intended to be performed by application 210 when the specific UI element 211 is touched. Optionally, the activation of the touch event is done by emulating touch at a location inside the selected area. The touch may be emulated at any coordinates (x,y) inside the selected area. The location of the emulated touch is selected by emulation module 204, for example, at the center of the area and/or at a random location inside the area.

Figure 4C:
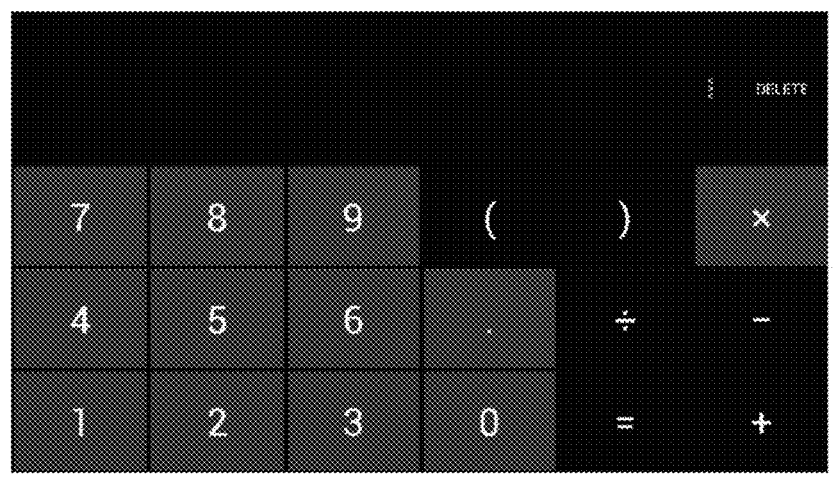
FIG. 4C is the UI of FIG. 3A with an activated touch event of UI element "multiplication", according to some embodiments of the present invention.

Reference is now made to FIG. 4C, which is the UI of FIG. 3A with an activated touch event of UI element "multiplication", according to some embodiments of the present invention.

Optionally, as shown at 106, a touch event of continuous touch is activated when user 220 presses activation key 232 for a prolonged time. Optionally, as shown at 107, a touch event of a finger swipe is activated when user 220 presses both a navigation key 231 and activation key 232 simultaneously.

Optionally, rendering system 205 includes a control command to start and/or stop the operation of system 200 and the emulation method. The control command may be initiated, for example, by the user pressing a dedicated key from the navigation keys and/or by the user selecting an option from a settings menu of rendering system 205. The control command may be similar or different for starting and stopping.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for emulating touch by navigation keys will be developed and the scope of the term touch emulation is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for executing an application, designed and coded to be operated only on a device including a touch-screen and only by touching the touch-screen, the method for executing said application on a device not having a touch-screen, the method comprising:

launching, on a device not having a touchable screen, an application designed and coded to be operated only on a device including a touchable screen and only by touching said touchable screen; and converting a plurality of touch response functionalities to key operated functionalities, by:

identifying a layout hierarchy structure of a plurality of user interface (UI) elements in said application, wherein at least one of said plurality of UI elements in said layout hierarchy structure includes at least one other UI element of said plurality of UI elements;

defining a plurality of areas of said UI, each corresponding with one of said plurality of UI elements associated with one of said touch response functionalities that executes in response to touching said touchable screen; and for each certain area of said plurality of areas, executing said one of said touch response functionalities associated with said UI element to which said certain area corresponds when an activation key is pressed by a user while said certain area is selected, said activation key being a physical key;

wherein said application is controllable using said activation key and additional keys when executing on said device not having a touchable screen according to said layout hierarchy structure;

wherein said identifying is performed while said application is executing on said device not having a touchable screen.

2. The method of claim 1, further comprising:
presenting a first indicator on a first of said plurality of areas; and
replacing said first indicator with a second indicator on a second of said plurality of areas according to a direction of a navigation key pressed by said user and according to said layout hierarchy structure, said navigation key being a physical key.

3. The method of claim 2 wherein said replacing is performed in response to said navigation key pressing event by said user.

4. The method of claim 2 wherein a first UI element corresponding with said first area and a second UI element corresponding with said second area are at the same level in said layout hierarchy structure.

5. The method of claim 2 wherein a first UI element corresponding with said first area is at a higher level than a second UI element corresponding with said second area in said layout hierarchy structure and said pressed navigation key is said activation key.

6. The method of claim 2 wherein a first UI element corresponding with said first area is at a lower level than a second UI element corresponding with said second area in said layout hierarchy structure and said pressed navigation key is a backwards navigation key.

7. The method of claim 1 wherein said executing is done by emulating a touch at a location inside said certain area that is selected.

8. The method of claim 1, further comprising:
activating a continuous touch event of said UI element corresponding with said certain area when said activation key is pressed for a prolonged time by said user.

9. The method of claim 1, further comprising:
activating a swipe touch event of said UI element corresponding with said certain area when both said activation key and a navigation key are pressed simultaneously by said user, said navigation key being a physical key.

10. A non-transitory computer readable medium comprising computer executable instructions adapted to perform the method of claim 1.

11. A system for executing an application designed and coded to be operated only on a device including a touch-screen and only by touching the touch-screen, the system for executing the application on a device not having a touch-screen, the system comprising:
a processor; and
a non-transitory memory having stored thereon program code for execution by the processor, said stored program code comprising:
code instructions to launch, on a device not having a touchable screen, an application designed and coded to be operated only on a device including a touchable screen and only by touching said touchable screen; and
code instructions to convert a plurality of touch response functionalities to key operated functionalities, by:
identifying a layout hierarchy structure of a plurality of user interface (UI) elements in said application, wherein at least one of said plurality of UI elements in said layout hierarchy structure includes at least one other UI element of said plurality of UI elements;
defining a plurality of areas of said UI, each corresponding with one of said plurality of UI elements associated with one of said touch response functionalities that executes in response to touching said touchable screen; and
executing, for each certain area of said plurality of areas, said one of said touch response functionalities associated with said UI element to which said certain area corresponds when an activation key is pressed by a user while said certain area is selected, said activation key being a physical key;
wherein said application is controllable using said activation key and additional keys when executing on said device not having a touchable screen according to said layout hierarchy structure;
wherein said identifying is performed while said application is executing on said device not having a touchable screen.

12. The system of claim 11, wherein said stored program code further comprising:
code instructions to replace a selected first area of said plurality of areas with a second of said plurality of areas according to a direction of a navigation key pressed by said user and according to said layout hierarchy structure, said navigation key being a physical key.

13. The method of claim 1, wherein said executing is performed without recoding of said application.

14. The method of claim 1, wherein said executing is performed repeatedly throughout operation of said application by said user.

15. The method of claim 1, wherein said executing is performed in real-time as part of said application.

16. A computer program product for executing an application designed and coded to be operated only on a device including a touch-screen and only by touching the touch-screen, the computer program product for executing the application on a device not having a touch-screen, the computer program product comprising a non-transitory computer readable storage medium storing program code thereon for execution by a processor, the program code comprising:
instructions to launch, on a device not having a touchable screen, an application designed and coded to be operated only on a device including a touchable screen and only by touching said touchable screen; and
instructions to convert a plurality of touch response functionalities to key operated functionalities, by:
identifying a layout hierarchy structure of a plurality of user interface (UI) elements in said application, wherein at least one of said plurality of UI elements in said layout hierarchy structure includes at least one other UI element of said plurality of UI elements;
defining a plurality of areas of said UI, each corresponding with one of said plurality of UI elements associated with one of said touch response functionalities that executes in response to touching said touchable screen; and
executing, for each certain area of said plurality of areas, said one of said touch response functionalities associated with said UI element to which said certain area corresponds when an activation key is pressed by a user while said certain area is selected, said activation key being a physical key;

wherein said application is controllable using said activation key and additional keys when executing on said device not having a touchable screen according to said layout hierarchy structure;

wherein said identifying is performed while said application is executing on said device not having a touchable screen.

17. The method of claim 1 wherein said executing is performed on a device having navigation keys but not touchable screen for operating through touching, said navigation keys being physical keys.

18. The method of claim 2 wherein said navigation key is included in a device selected from a group consisting of remote controlling device and trackball.

* * * * *